(12) United States Patent
Souza et al.

(10) Patent No.: US 7,490,807 B2
(45) Date of Patent: Feb. 17, 2009

(54) OBJECT STAND

(75) Inventors: Timothy M. Souza, Lebanon, OR (US); Dennis R. Esterberg, Philomath, OR (US); David L. Smith, Corvallis, OR (US); Jeffrey Scott Bakkom, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 766 days.

(21) Appl. No.: 10/875,023

(22) Filed: Jun. 23, 2004

(65) Prior Publication Data

US 2005/0284990 A1     Dec. 29, 2005

(51) Int. Cl.
    A47G 29/00    (2006.01)

(52) U.S. Cl. ............... 248/372.1; 248/133; 248/122.1; 248/291.1; 248/292.12; 248/292.13; 248/371; 248/398; 248/346.04; 248/222.52; 108/1; 108/2; 108/6; 108/7

(58) Field of Classification Search ................. 248/133, 248/122.1, 124.1, 291.1, 292.12, 292.13, 248/371, 393, 397, 424, 372.1, 394, 395, 248/396, 398, 222.51, 222.52, 429, 419, 248/420, 346.01, 346.03, 346.04; 108/1, 108/2, 5, 6, 7, 8, 9
See application file for complete search history.

(56) References Cited

U.S. PATENT DOCUMENTS

| | | | | |
|---|---|---|---|---|
| 2,796,226 | A | * | 6/1957 | Dalton et al. ............ 248/183.2 |
| 3,545,710 | A | * | 12/1970 | Mooney ................... 248/183.2 |
| 3,740,011 | A | * | 6/1973 | Dickson et al. .......... 248/183.4 |
| 3,970,274 | A | * | 7/1976 | Resk ........................ 248/185.1 |
| 4,225,105 | A | * | 9/1980 | Nakamura ................ 248/184.1 |
| 5,357,870 | A | * | 10/1994 | Guichard et al. ............... 108/2 |
| 5,372,347 | A | * | 12/1994 | Minnich ..................... 248/371 |
| 5,622,348 | A | * | 4/1997 | Stechly ....................... 248/371 |
| 6,354,552 | B1 | * | 3/2002 | Chiu .......................... 248/422 |
| 7,040,589 | B2 | * | 5/2006 | Wang ..................... 248/289.11 |

* cited by examiner

*Primary Examiner*—J. Allen Shriver
*Assistant Examiner*—Todd M. Epps

(57) ABSTRACT

A embodiment of a stand includes a base, a support, and a biasing member. The biasing member provides a biasing force to urge the support to a first position relative to the base from a second position relative to the base. When in the second position the support is allowed to rotate on a pivot, and when in the first position the support is prevented from rotating on the pivot.

19 Claims, 14 Drawing Sheets

OBJECT STAND

BACKGROUND

A projector is used to cast images on a target such as a screen. The images can include still or motion video that provide useful visual aids for a presentation. Often, an individual giving a presentation is responsible for providing and setting up a projector. Set up can involve finding a suitable stand to supporting the projector and then aiming the projector at a screen. Aiming can often prove to be a process of trial and error especially when the projector and the screen are at different elevations.

DETAILED DESCRIPTION

INTRODUCTION: Embodiments of the present invention provide a stand that is adjustable to hold an object such as a projector at a desired orientation. Adjustments allow the projector to cast an image on target that is either higher or lower in elevation than the projector. Throughout the following description references are made to use of embodiments of the stand for supporting a projector. It is to be understood, however, that other objects may be supported such as cameras, levels, laser sights, telescopes, or even table tops.

The following description is broken into sections. The first section, labeled "components," describes an example of the components that can be used to assemble an exemplary stand. The second section, labeled "operation", provides examples of a stand in use. The third section labeled "alternative configurations" describes examples of alternative constructions of exemplary object stands and their operation.

Figure 1:
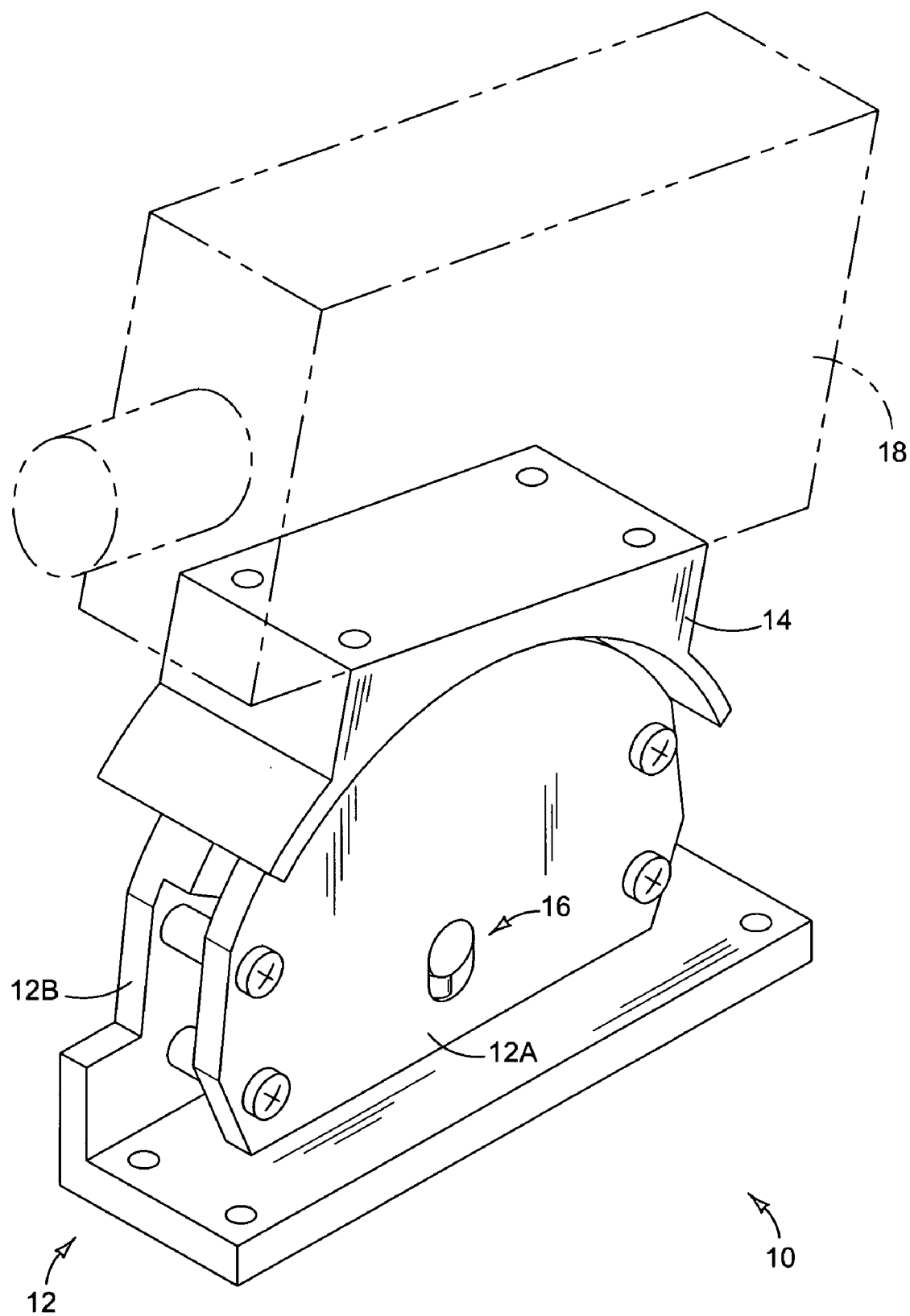
FIG. 1 is a perspective view of an exemplary object stand according to an embodiment of the present invention.

COMPONENTS: FIG. 1 is a perspective view of an exemplary stand 10. As shown, stand 10 includes base 12, support 14, and pivot 16. Base 12 represents generally any structure capable of providing a foundation for stand 10. As shown here base 12 includes two base pieces 12A and 12B. Support 14 represents generally any structure capable of holding or otherwise supporting an object. In this case, support 12 is holding projector 18. Pivot 16 represents generally any structure on which support 14 can rotate relative to base 12. As will be shown with reference to FIGS. 4 and 5, pivot 16 also serves to assist in coupling support 14 to base 12.

Figure 2:
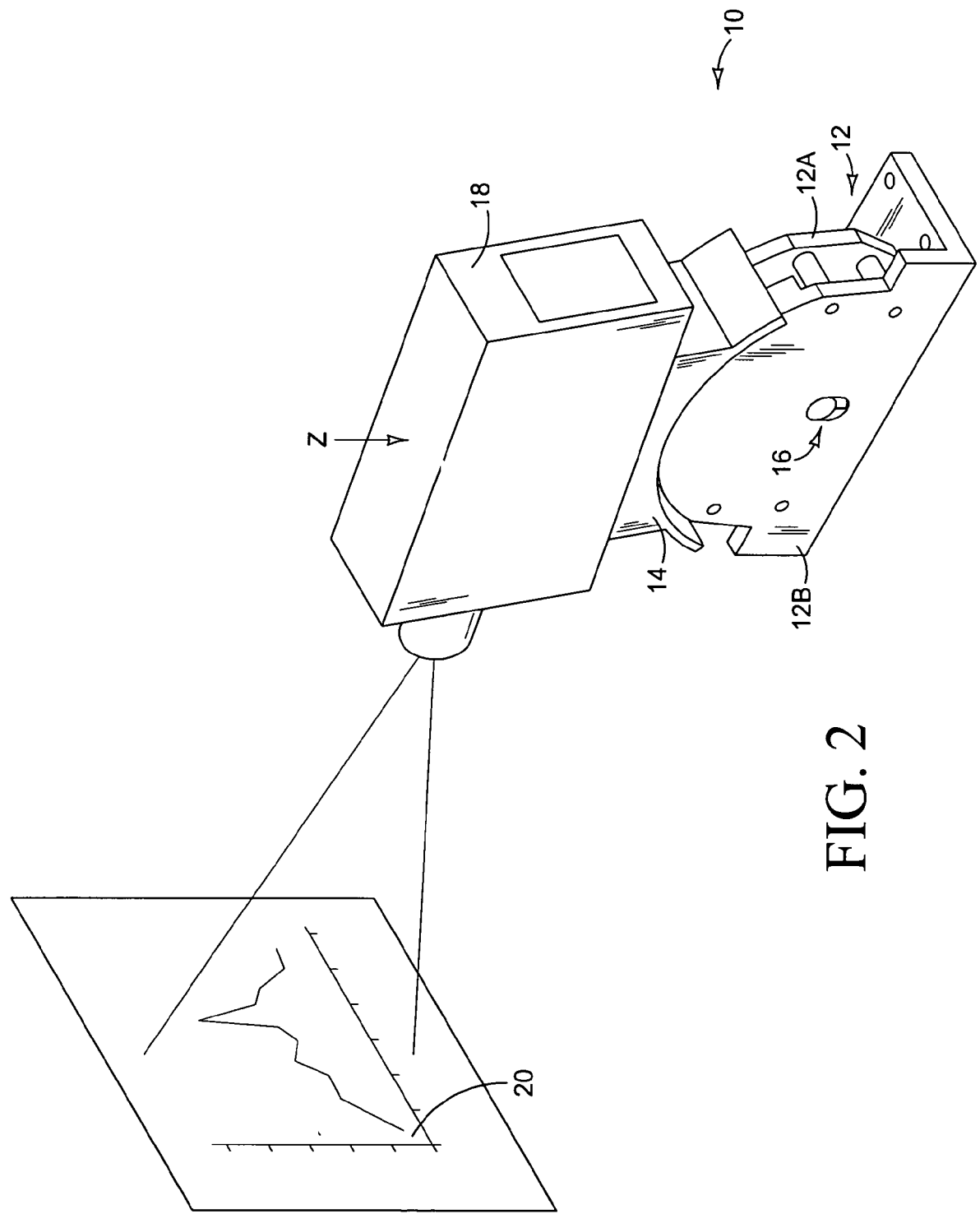
FIGS. 2 and 3 are views of the exemplary object stand of FIG. 1 adjusted to cast images at different elevations according to an embodiment of the present invention.
Figure 3:
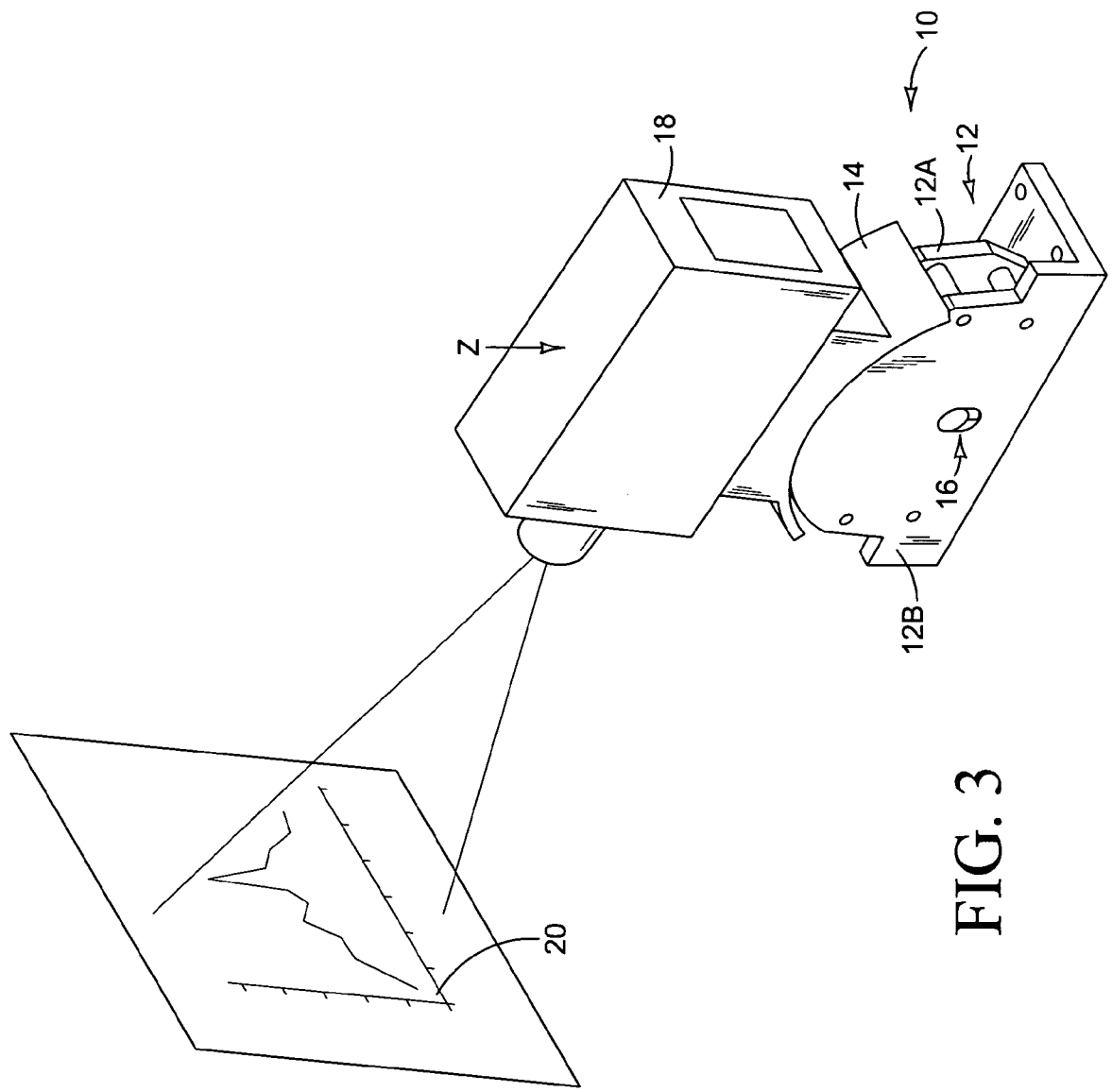

Referring to FIG. 2, as support 14 is rotated (counterclockwise in this example) an image 20 cast by projector 18 moves downward relative to the elevation of projector 18. Moving on to FIG. 3, as support 14 is rotated in the opposite direction (clockwise in this example) image 20 cast by projector 18 moves upward relative to the elevation of projector 18. As will be described in more detail below, the application of a sufficient pressure on support 14 in the direction generally indicated by arrow (Z) will allow support 14 to rotate on pivot 16 relative to base 12. Removal of that pressure will cause support 14 to be held stationary relative to base 12 in desired a portion to which support 14 has been rotated. In this manner, the rotational position of support 14 relative to base 12 can be adjusted and then held fixed so, for example, an image cast by projector 18 can be aimed and then held fixed on a selected target.

Figure 4:
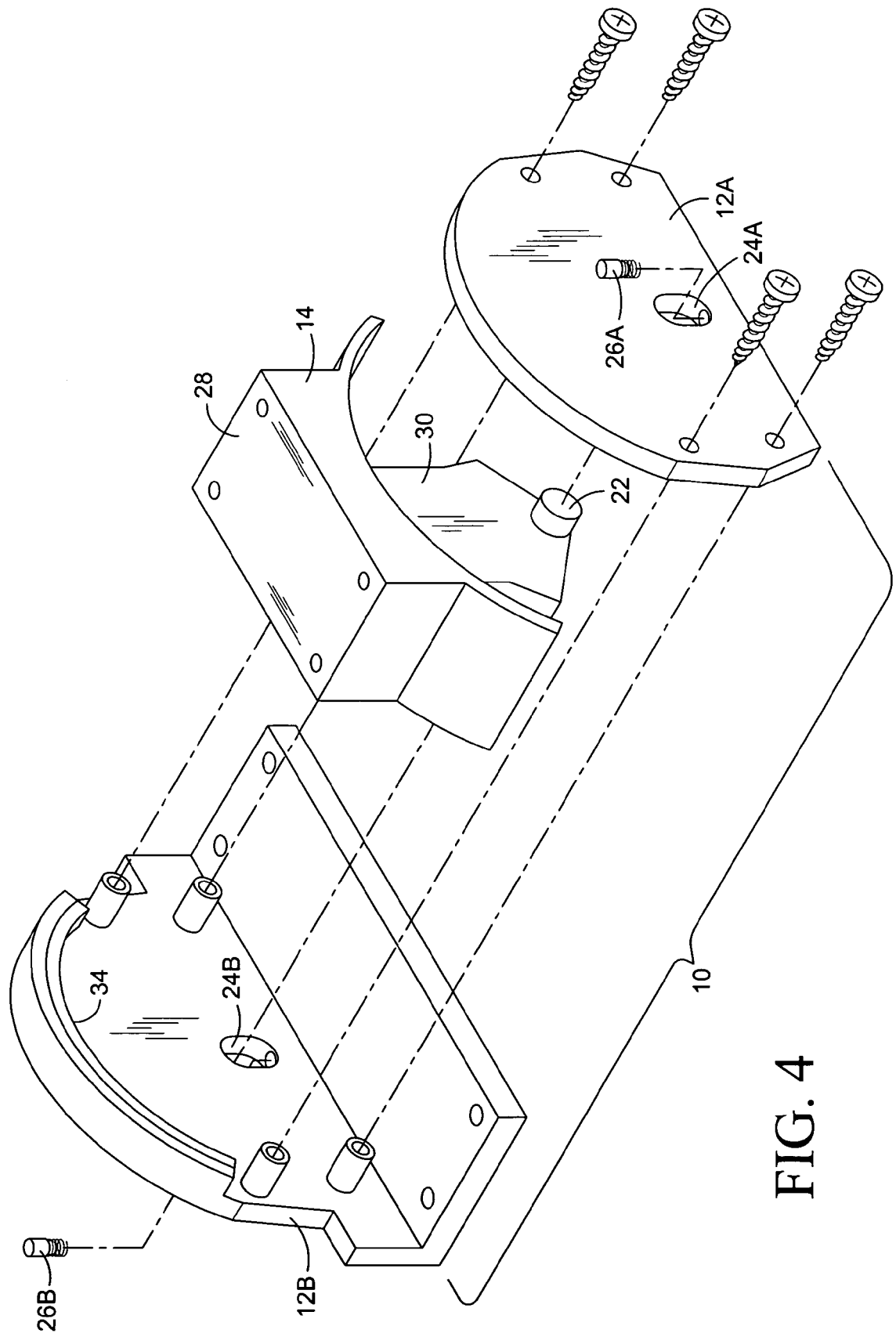
FIGS. 4 and 5 are exploded perspective views of the exemplary object stand of FIG. 1 according to an embodiment of the present invention.
Figure 5:
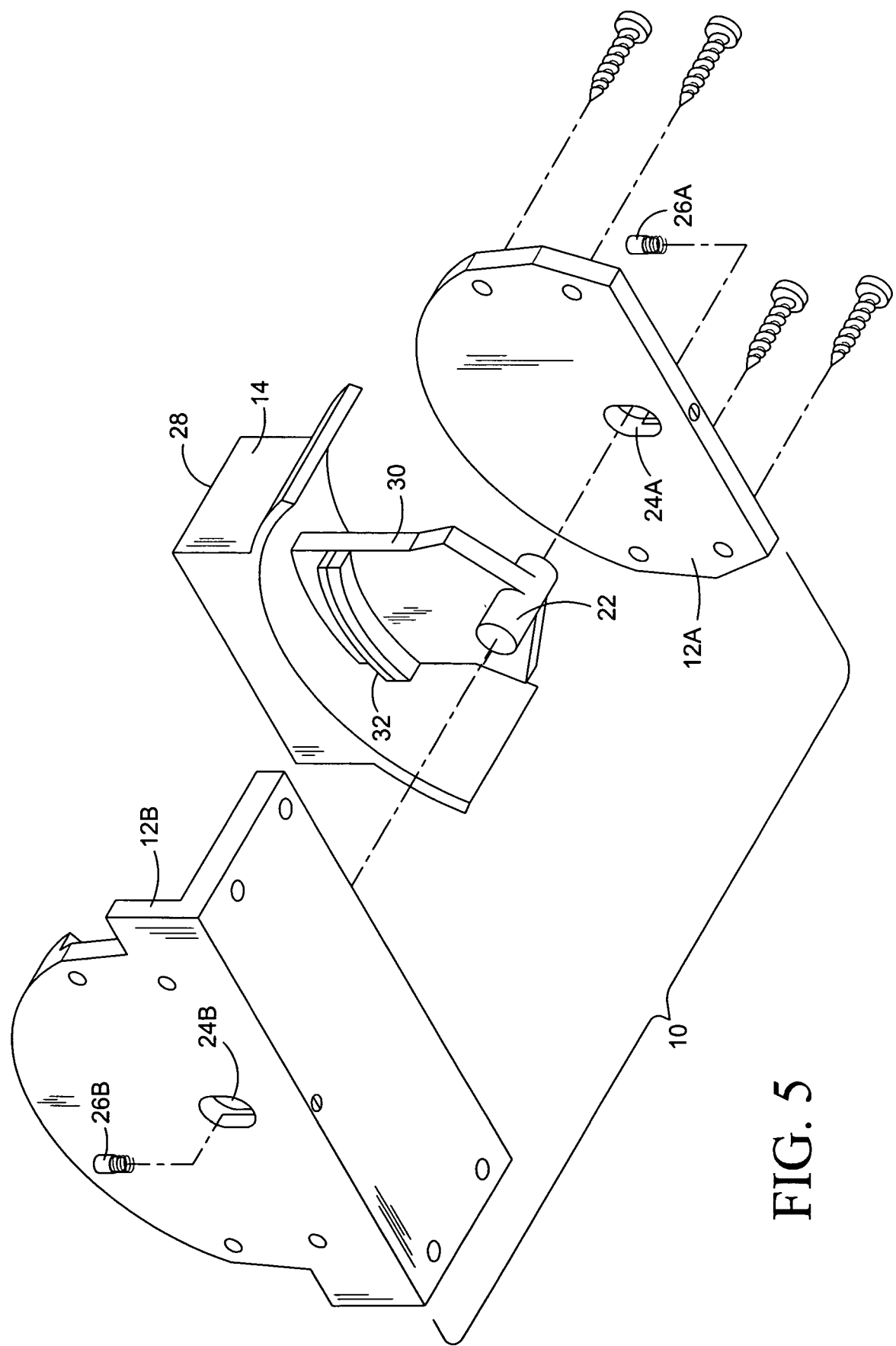

FIGS. 4 and 5 provide exploded perspective view of stand 10. Here, base 12 is made of base pieces 12A and 12B. In this example, pivot 16 is defined by pin 22 and slots 24A and 24B. Pin 22 is coupled to support 14 while slots 24A and 24B are formed in base pieces 12A and 12B. Opposing ends of pin 22 fit within slots 24A and 24B respectively which are shaped to allow pin 22 to rotate on its axis and to move linearly within slots 24A and 24B along a path defined by slots 24A and 24B.

Stand 10 also includes a biasing member designed to supply a biasing force on pin 16 or in this case pin 22. In the example of FIGS. 4 and 5, the biasing member is represented as spring bodies 26A and 26B. Each spring body 26A and 26B is designed to fit within a corresponding slot 24A or 24B. With opposing ends of pin 16 inserted in slots 24A and 24B, spring bodies 26A and 26B apply a biasing force on pin 22 urging pin 22 and support 14 along a path defined by slots 24A and 24B. Although illustrated to include springs, it is noted that the biasing member may include any structure capable of recovering its original shape when released after being distorted.

Support 14 is shown as including platform 28 and arm 30. Platform 28 represents generally any structure capable of supporting an object. Arm 30 represents generally any structure designed to join pivot 16, in this case pin 22, to platform 28. Attached to arm 30 is catch 32 (visible in FIG. 5). Attached to base 12 is catch surface 34 (most visible in FIG. 4). Catch 32 and catch surface 34 represent generally any structures capable of engaging one another such that when engaged, they operate to oppose attempts to rotate support 14 on pivot 16, in this case pin 22. As shown, catch surface 34 is a concave arced surface whose cross section defines a semicircle. Pin 22 roughly defines the center point of that semicircle.

As is discussed below, the biasing force supplied by spring bodies 26A and 26B urge support 14 along a path defined by slots 24A and 24B until catch 32 engages catch surface 34. Once engaged, support 14 is prevented from rotating on pin 22. A sufficient pressure applied to support 14 will overcome the biasing force of spring bodies 26A and 26B allowing support 14 to reverse direction along the path defined by slots 24A and 24B disengaging catch from catch surface 34. Once disengaged, support 14 is allowed to rotate on pin 22.

Figure 6:
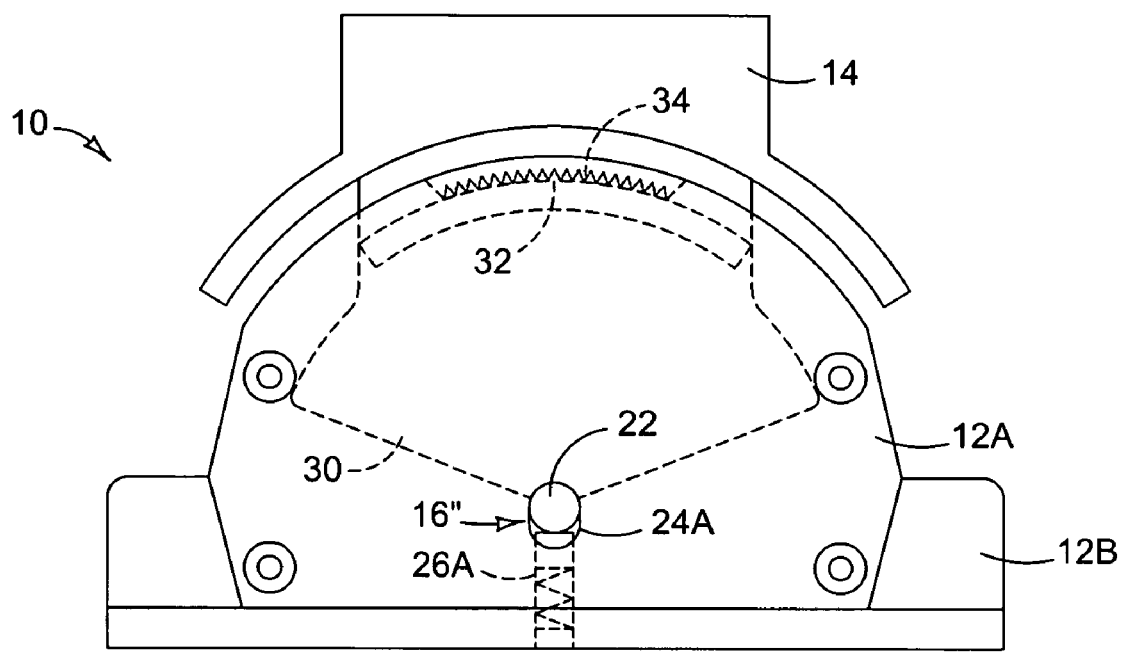
FIGS. 6-10 illustrate the operation of the exemplary object stand of FIG. 1.

OPERATION: FIGS. 6-11 show the operation of stand 10 whose components are shown and described with reference to FIGS. 1-5. Starting with FIG. 6, the biasing force supplied by spring body 26A and 26B (not visible) is urging pin 22 and support 14 into a first position along a path defined by slots 24A and 24B (not visible) in which catch 32 is in contact with and engaging catch surface 34. In the example shown, catch surface 34 includes a series of teeth configured to be engaged by catch 32. When engaged as shown in FIG. 6, support 14 is prevented from rotating on pin 22.

Figure 7:
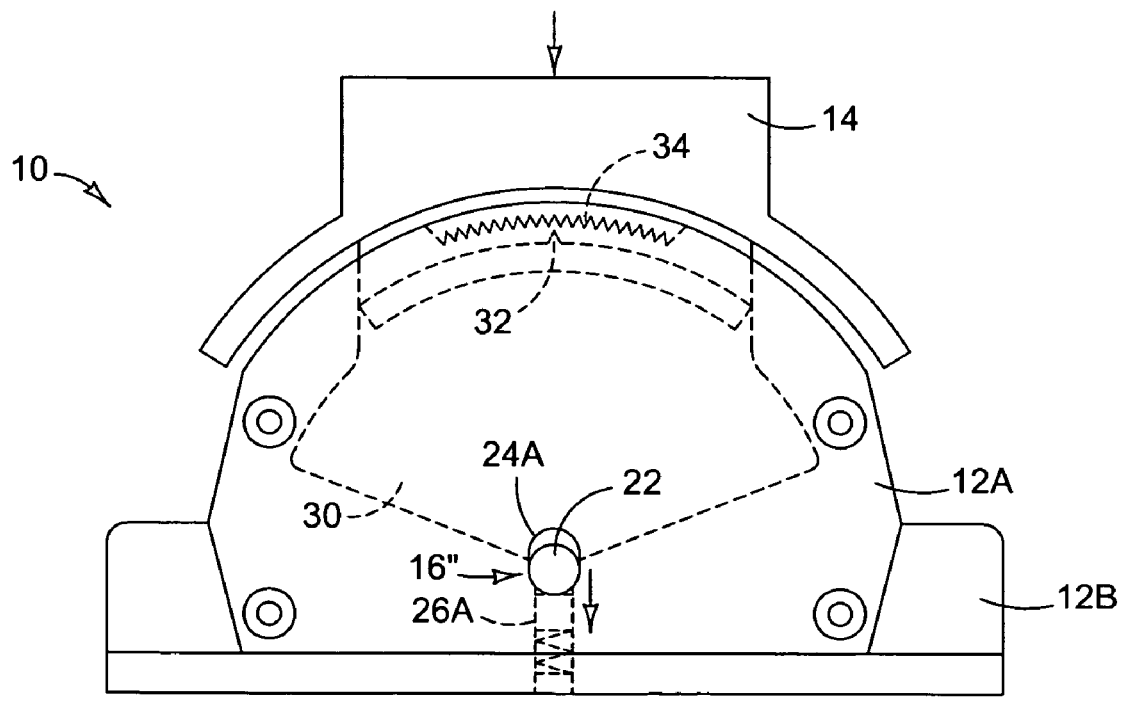

Referring now to FIG. 7, pressure opposing the biasing force supplied by spring bodies 26A and 26B (not visible) is applied to support 14. The pressure, once sufficient, overcomes the biasing force and causes support 14 and pin 22 to shift from the first position into a second position along the path defined by slots 24A and 24B (not visible) in which catch 32 is disengaged from catch surface 34. Once disengaged, support 14 is allowed to rotate on pin 22.

As can be seen in FIGS. 6 and 7, slots 24A and 24B define a path of travel for pin 22 and support 14. The endpoints of that path of travel define the first position, in which catch 32 and catch surface 34 are engaged and the second position, in which catch 32 and catch surface 34 are disengaged. In the example shown, slots 24A and 24B are designed such that the path of travel is just long enough to allow catch 32 to be disengaged from catch surface 34.

Figure 8:
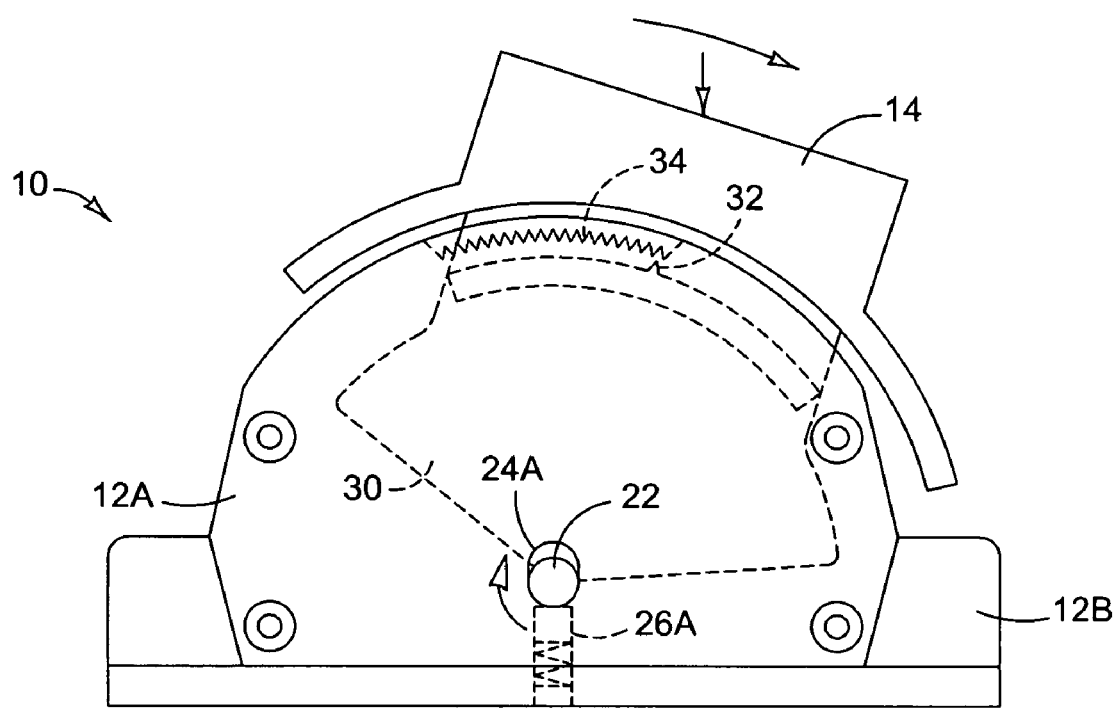
Figure 9:
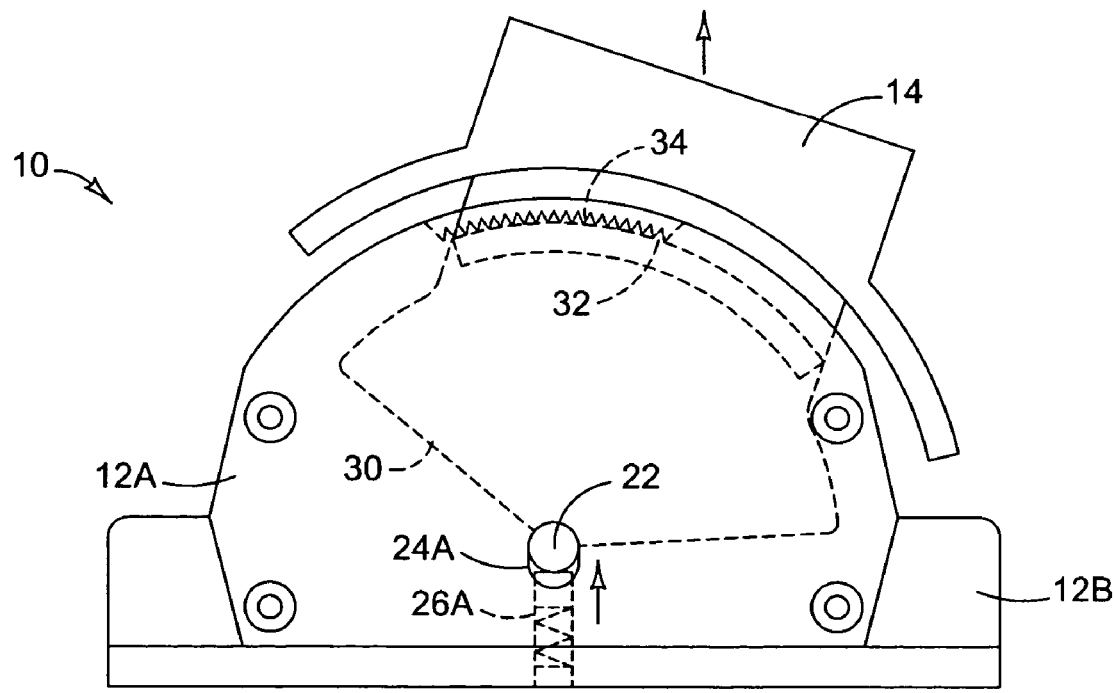

Moving to FIG. 8, support 14 is rotated, in this example, clockwise on pin 22 while the pressure opposing the biasing force supplied by spring bodies 26A and 26B (not visible) is maintained. Maintaining the pressure keeps support 14 in the second position and catch 32 disengaged from catch surface 34. In FIG. 9, the pressure opposing the biasing force supplied by spring bodies 26A and 26B (not visible) is released allowing the biasing force to urge support 14 back into the first position in which catch 32 engages catch surface 34. Once engaged, support 14 is prevented from rotating on pin 22.

It is noted that catch 32 and catch surface 34 can be of a non-toothed design. For example, catch 32 may include an over-molded elastomer or "brake pad" that supplies a relatively high coefficient of friction when it engages catch surface 32.

Figure 10:
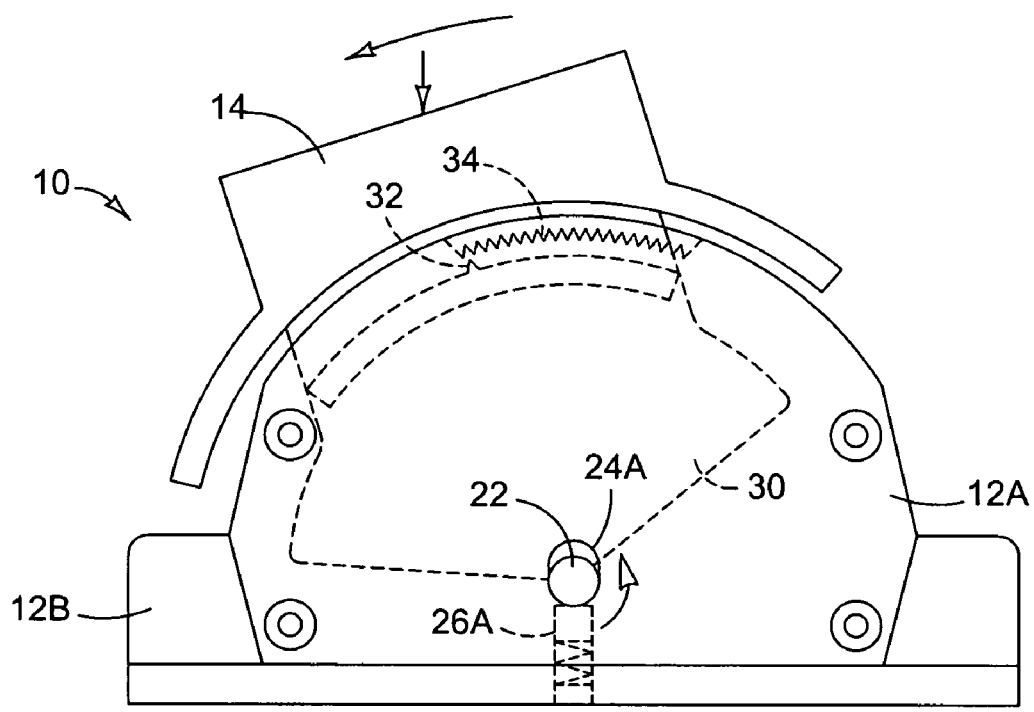
Figure 11:
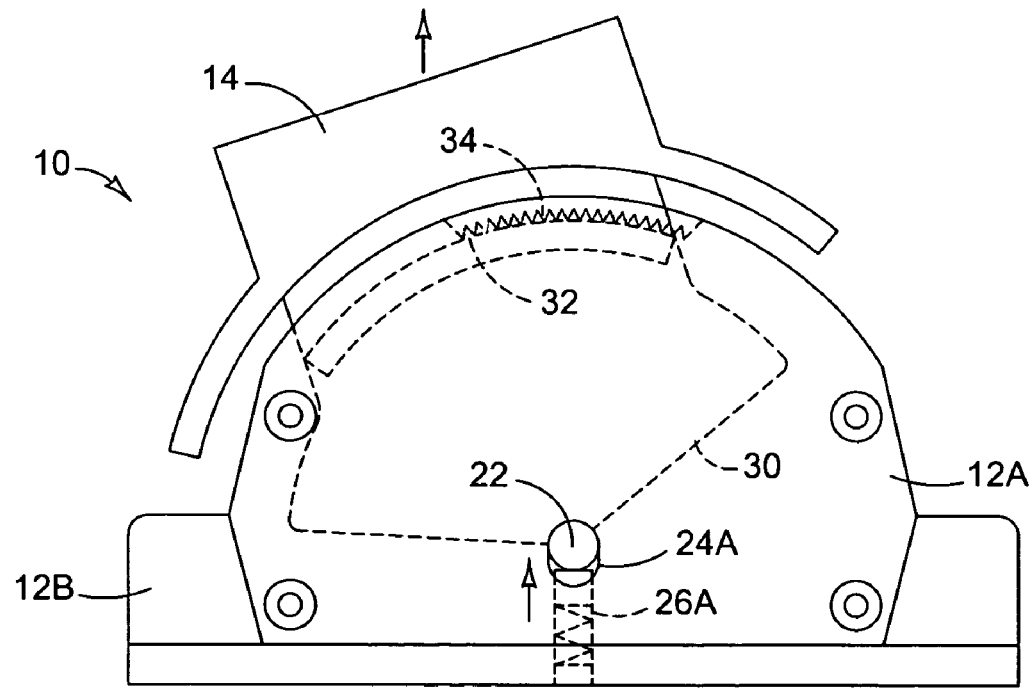
FIGS. 11-21 illustrate alternative constructions of exemplary object stands and their operation according to alternative various embodiments of the present invention.

Moving to FIG. 10, pressure is applied to support 14 sufficient to overcome the biasing force supplied by spring bodies 26A and 26B (not visible) and to disengage catch 32 from catch surface 34. Support 14 is rotated, in this example, counter-clockwise on pin 22. In FIG. 11, the pressure opposing the biasing force supplied by spring bodies 26A and 26B (not visible) is released allowing the biasing force to cause catch 32 to engage catch surface 34. Once engaged, support 14 is once again prevented from rotating on pin 22.

ALTERNATIVE CONFIGURATIONS: FIGS. 1-11 illustrate an exemplary configuration of stand 10 according to an embodiment of the present invention. Other configurations fall within the scope of the invention. FIGS. 12-21 Illustrate two of those alternate configurations.

Figure 12:
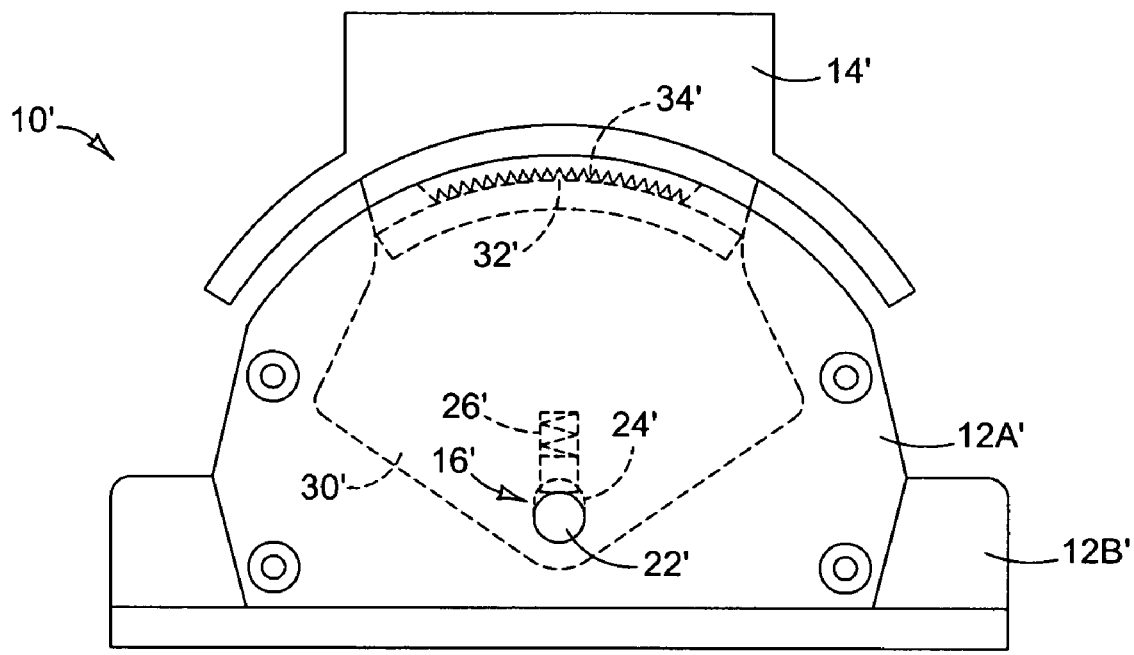

FIG. 12 illustrates an alternative configuration of an exemplary stand referenced as stand 10'. Stand 10' includes base 12', support 14', pivot 16', and biasing member 18'. Here, pivot 16' includes pin 22' and slot 24'. Pin 22' is coupled to base 12' while slot 24' is formed in arm 30' of support 14'. Biasing member 18' includes spring body 26' designed to fit within slot 24' in arm 30'. With pin 22' inserted through slot 24', spring body 26' applies a biasing force on pin 22' urging support 14' along a path defined by slot 24' into a first position in which catch 32' engages catch surface 34'.

Figure 13:
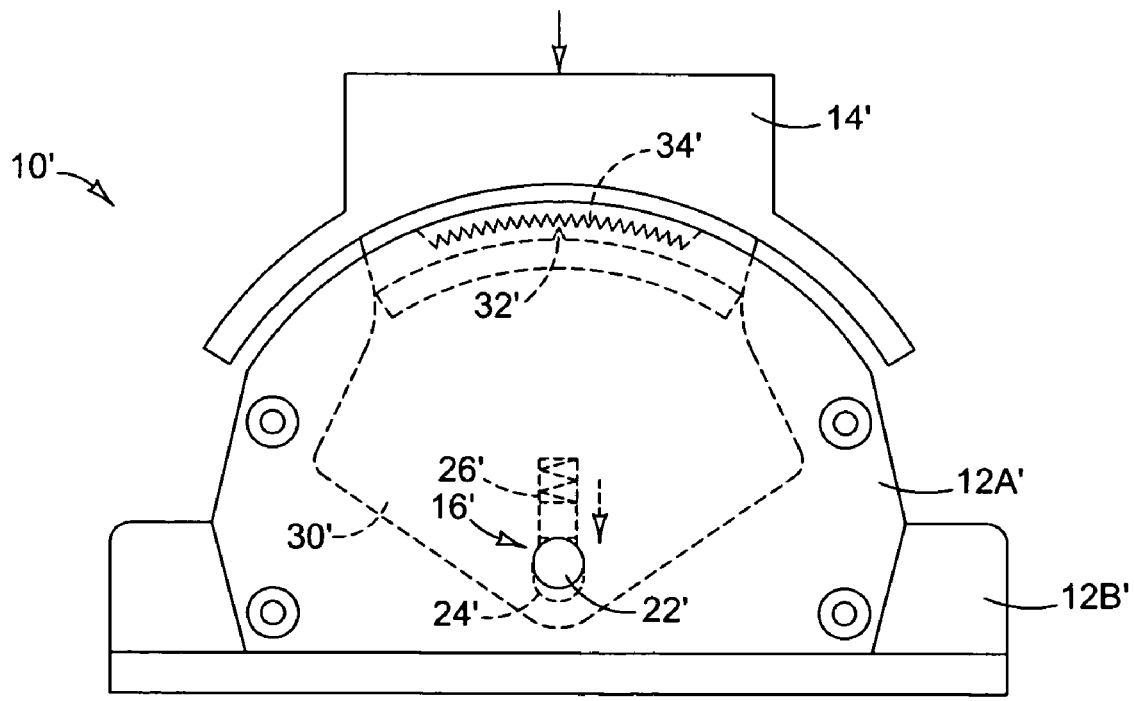

Moving to FIG. 13, pressure has been applied to support 14' sufficient to overcome the biasing force supplied be spring body 26' and causing support 14' to shift into a second position along the path defined by slot 24'. In the second position, catch 32' is disengaged from catch surface 34' allowing support 14' to rotate on pin 22'.

Figure 14:
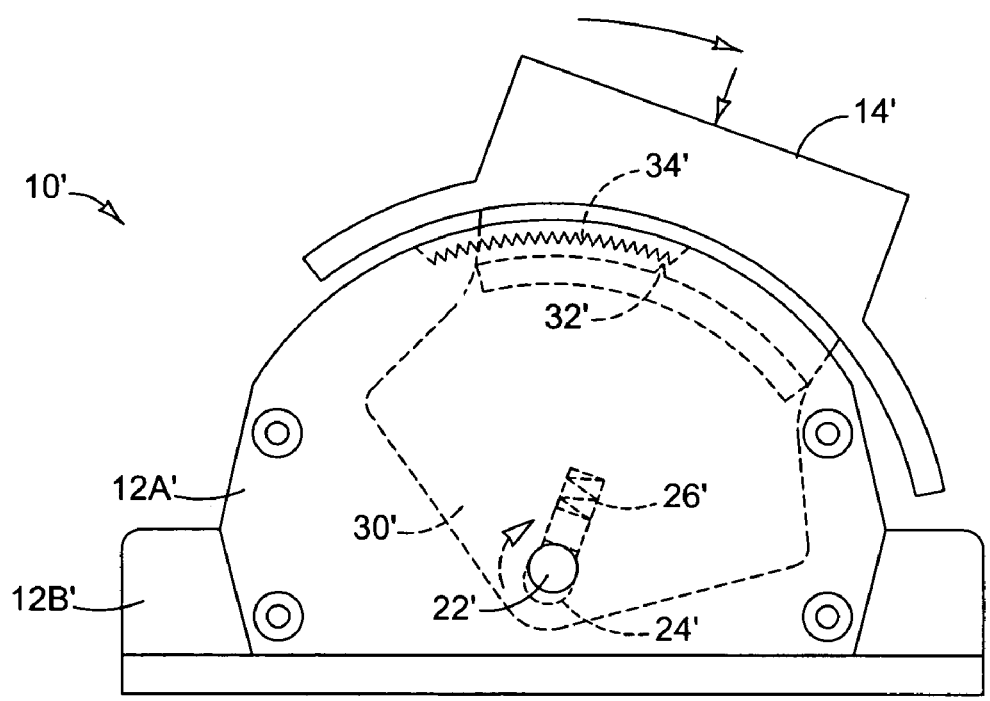
Figure 15:
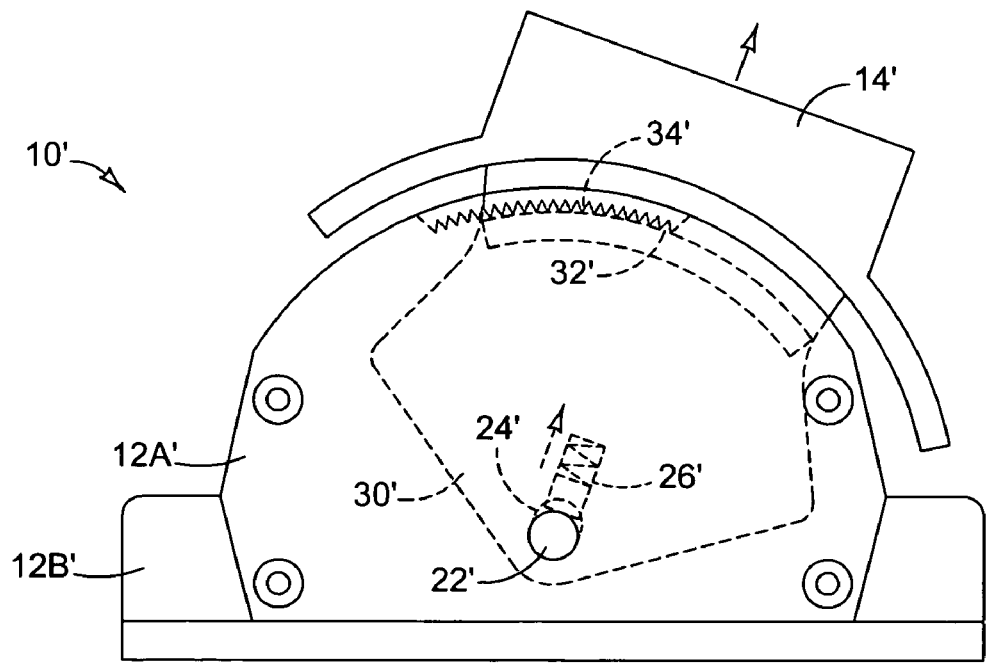

In FIG. 14, support 14' is rotated, in this example, clockwise on pin 22' while the pressure opposing the biasing force supplied by spring body 26' is maintained. Maintaining the pressure keeps support 14' in the second position and catch 32' disengaged from catch surface 34'. In FIG. 15, the pressure opposing the biasing force supplied by spring body 26' is released allowing the biasing force to urge support 14' back into the first position in which catch 32' engages catch surface 34'. Once engaged, support 14' is prevented from rotating on pin 22'.

Figure 16:
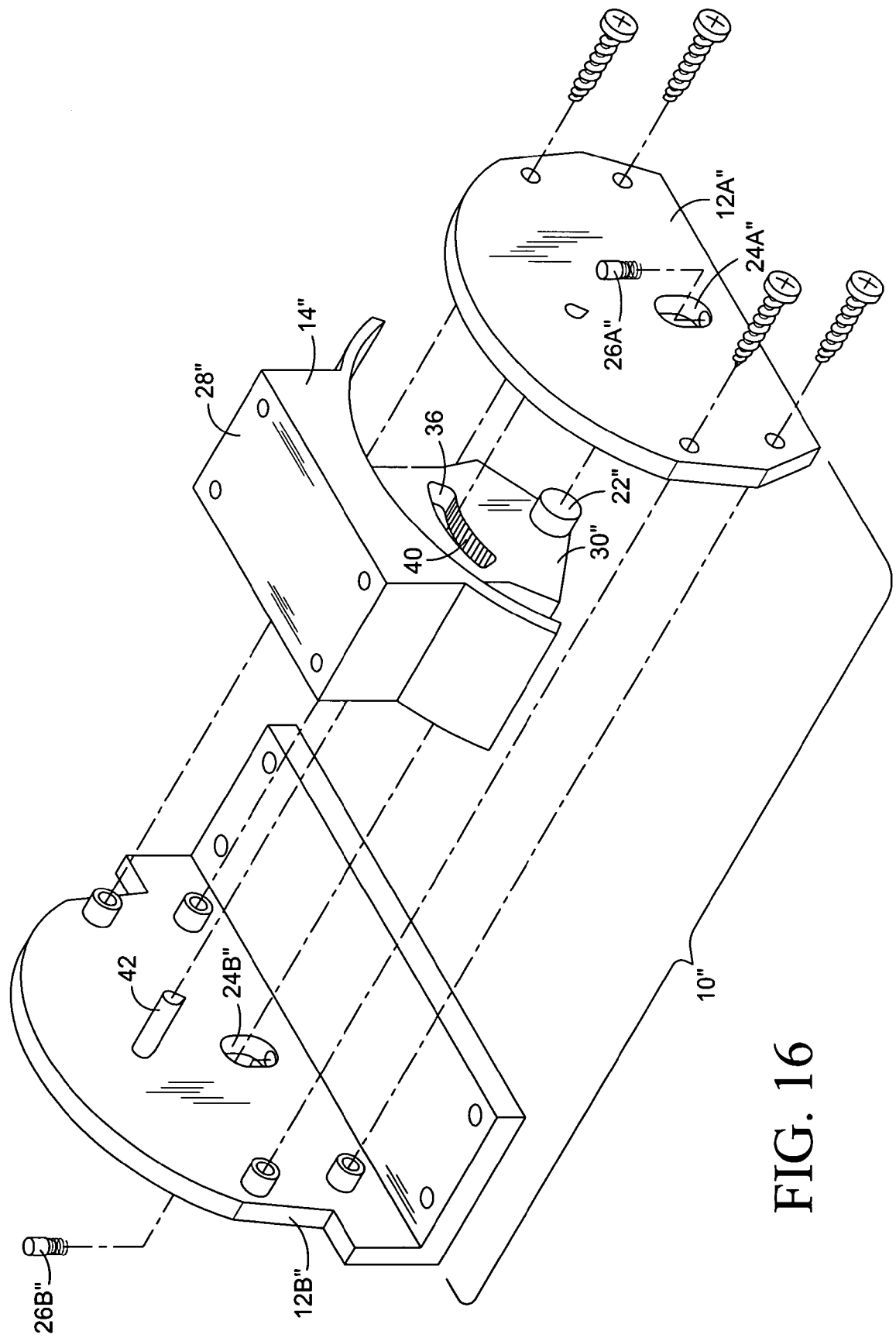
Figure 17:
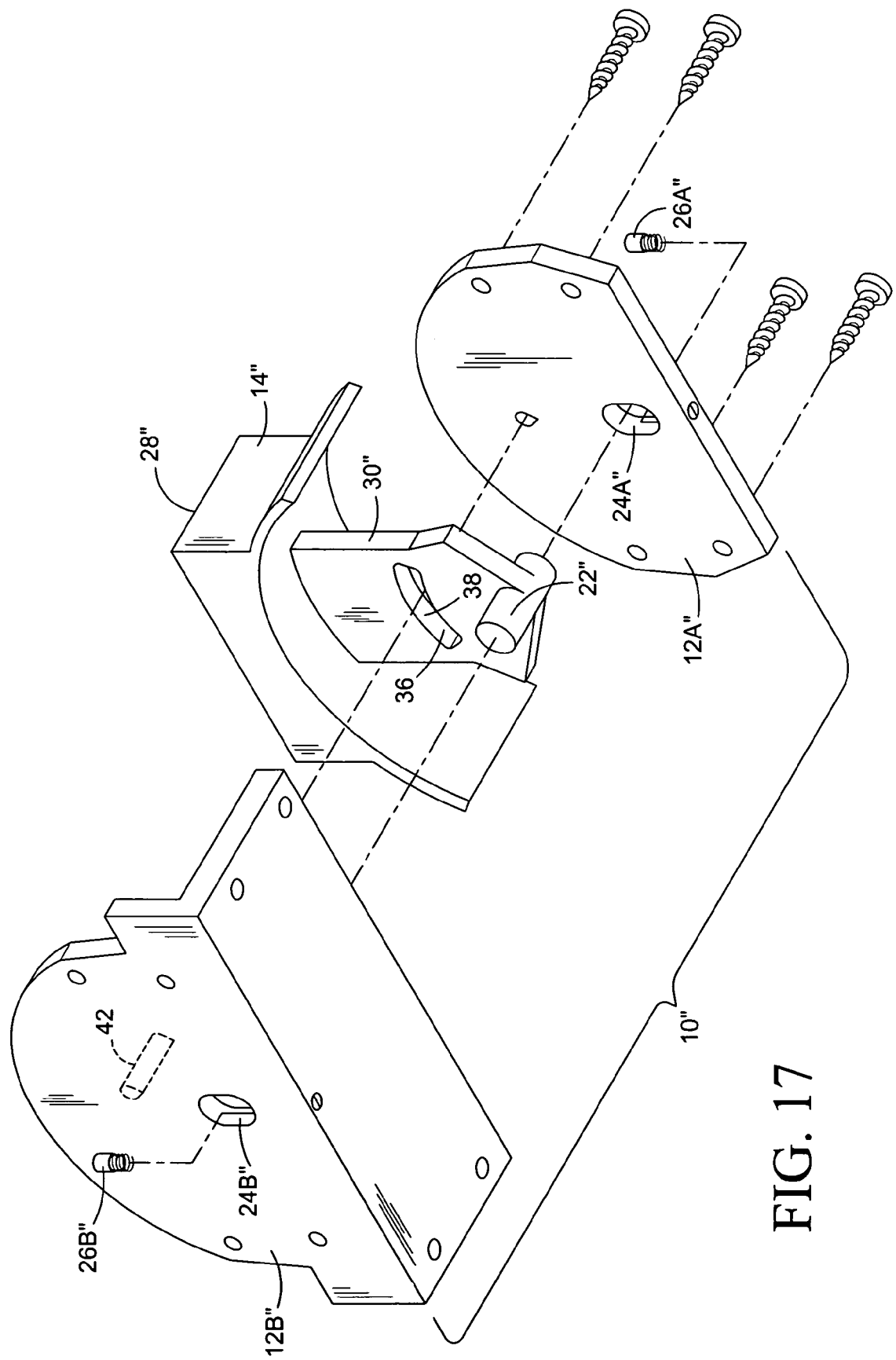

FIGS. 16 and 17 illustrate an alternative configuration of an exemplary stand referenced as stand 10". Stand 10" includes base 12", support 14", a pivot 16" (pin 22" and slots 24A" and 24B"), and biasing member (spring bodies 26A" and 26B").

Here, support 14" includes platform 28" coupled to arm 30". Arm 30" includes arc shaped slot 36 that defines opposing arc shaped surfaces, slip surface 38 and catch surface 40. Catch surface 40 is positioned along arm 30" between pin 22" and slip surface 40. Stand 10" also includes catch 42 shown as an elongated structure coupled to base 12" and inserted though arc shaped slot 36. Arc shaped slot 36 has a center point that is roughly defined by pin 22" allowing support 14" to rotate on pin 22" with catch 42 inserted through arc shaped slot 36. Arc shaped slot 36 designed and positioned such that when support 14" is shifted to the second position, catch 42 contacts slip surface 38 in a manner that allows the arm to rotate on the pivot. For example, friction between catch 42 and slip surface 38 may be relatively small compared the friction between catch 42 and catch surface 40.

Figure 18:
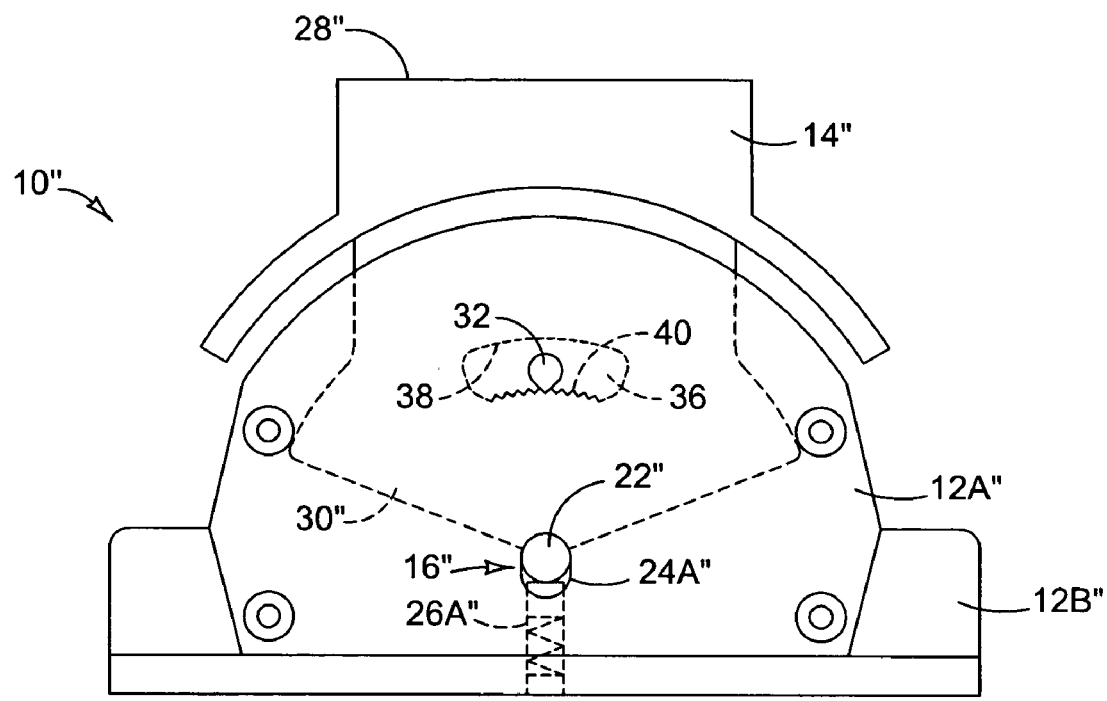

Referring now to FIG. 18, the biasing force supplied by spring bodies 26A" and 26B" (not visible) urges pin 22" and support 14" into a first position along a path defined by slots 24A" and 24B" (not visible) in which catch 42 is in contact with and engaging catch surface 40. In the example shown, catch surface 40 includes a series of teeth configured to be engaged by catch 42. When engaged as shown in FIG. 18, support 14" is prevented from rotating on pin 22".

Figure 19:
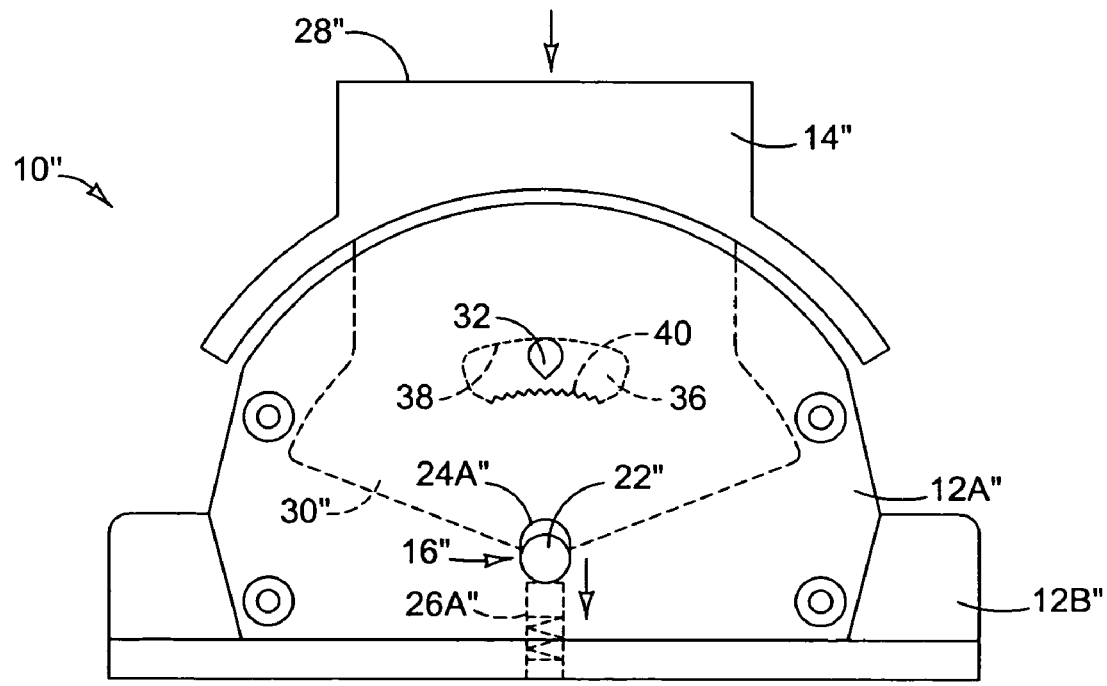

Referring now to FIG. 19, pressure opposing the biasing force supplied by spring bodies 26A" and 26B" (not visible) is applied to support 14". The pressure, once sufficient, overcomes the biasing force and causes support 14" and pin 22" from the first position into a second position along a path defined by slots 24A" and 24B" (not visible) in which catch 42 is disengaged from catch surface 40. Once disengaged, support 14" is allowed to rotate on pin 22".

Figure 20:
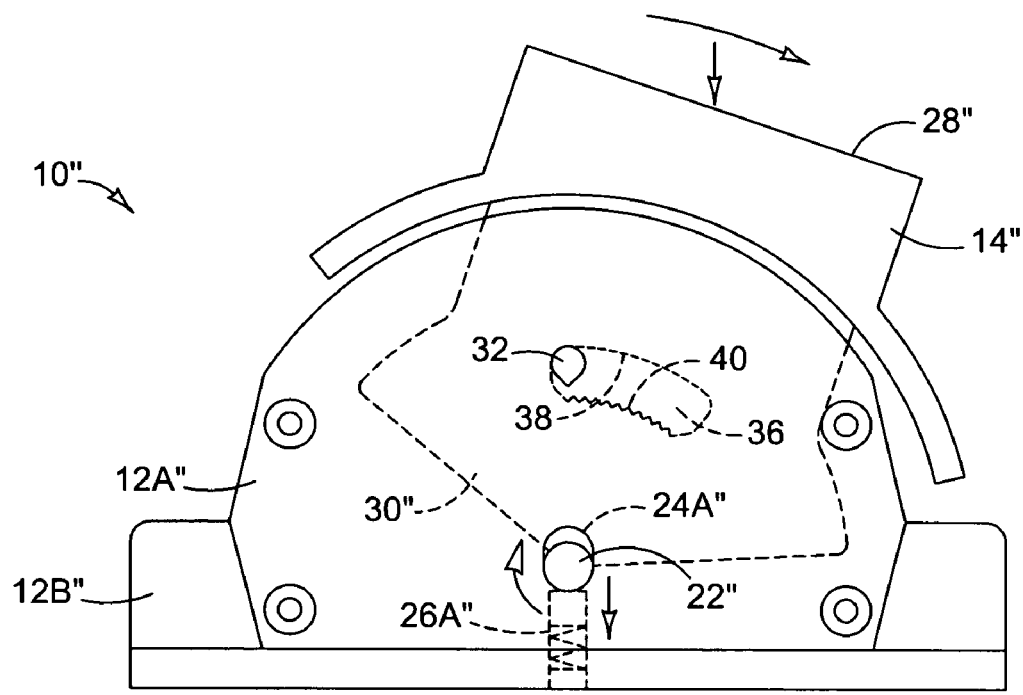
Figure 21:
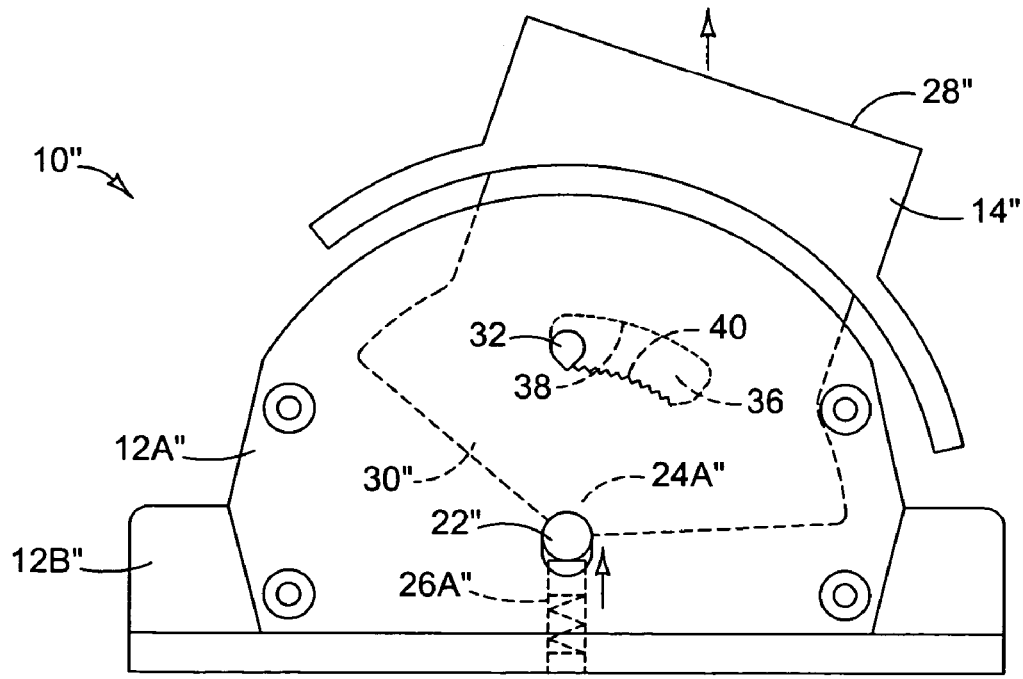

Moving to FIG. 20, support 14" is rotated, in this example, clockwise on pin 22" while the pressure opposing the biasing force supplied by spring bodies 26A" and 26B" (not visible) is maintained. Maintaining the pressure keeps support 14" in the second position and catch 42 disengaged from catch surface 40. In FIG. 21, the pressure opposing the biasing force supplied by spring bodies 26A" and 26B" (not visible) is released allowing the biasing force to urge support 14" back into the first position in which catch 42 engages catch surface 40. Once engaged, support 14" is prevented from rotating on pin 22.

CONCLUSION: The illustrations provided in FIGS. 1-21 illustrate various embodiments of the present invention. The figures illustrate various implementations of a stand that is adjustable to hold an object at a desired orientation. While the present invention has been shown and described with reference to the foregoing exemplary embodiments, it is to be understood that other forms, details, and embodiments may be made without departing from the spirit and scope of the invention which is defined in the following claims.

What is claimed is:

1. A projector stand, comprising:
   a base;
   a support configured to hold a projector casting an image on a screen;
   a biasing member providing a biasing force to urge the support to a first position relative to the base from a second position relative to the base;
   wherein, when in the second position the support is allowed to rotate on a pivot and when in the first position the support is prevented from rotating on the pivot; and
   wherein a sufficient pressure on the support overcomes the biasing force of the biasing member urging the support out of the first position and into the second position allowing the support to rotate on the pivot, the rotation causing the image cast on the screen by the projector to move.

2. The projector stand of claim 1, wherein:
the rotation causes the image cast on the screen to move from a third position to a fourth position; and
release of the pressure on the support allows the biasing force of the biasing member to urge the support out of the second position and into the first position holding the image cast on the screen in the fourth position.

3. A stand, comprising:
a base;
a pivot;
a support coupled to the base at the pivot such that the support can, relative to the base, be rotated on the pivot and shifted between a first position and a second position relative to the base;
a means for providing a biasing force to urge the support to the first position from the second position; and
a means for preventing the support from rotating on the pivot when the support is in the first position wherein the support is coupled to the base such that the support can be shifted in a generally linear fashion between the first position and the second position.

4. The stand of claim 3, wherein the pivot includes a pin and a slot, the pin being inserted through and rotatable within the slot and wherein the slot defines a path of travel for the support, the first and second positions being defined by endpoints of the path of travel.

5. The stand of claim 3, further comprising a means for allowing the support rotate on the pivot when the support is in the second position.

6. A system, comprising:
a base;
a support;
a pivot on which the support can rotate relative to the base;
a catch surface;
a catch capable of engaging and being separated from the catch surface; and
a biasing member providing a biasing force that urges, relative to the base, the support from a second position in which the catch is disengaged from the catch surface to a first position in which the catch engages the catch surface wherein the support includes an arm coupled to a platform, the catch is coupled to the arm; and the arm is coupled to the base at the pivot.

7. The system of claim 6, wherein the pivot includes a pin and a slot, the pin being inserted through and rotatable within the slot and wherein the slot defines a path of travel for the support, the first and second positions being defined by endpoints of the path of travel.

8. The system of claim 6, wherein a sufficient pressure on the support overcomes the biasing force of the biasing member and separates the catch from the catch surface allowing the support to rotate on the pivot.

9. The system of claim 6, wherein the support is coupled to the base at the pivot.

10. The system of claim 6, wherein the catch surface is coupled to the base.

11. The system of claim 6, wherein the catch surface is a generally concave surface whose cross section defines a semicircle, the pivot at least roughly defining a center point of the semicircle.

12. The system of claim 6, wherein
the support includes an arm coupled to a table;
the catch surface is formed as part of the arm; and
the arm is coupled to the base at the pivot.

13. The system of claim 12, wherein the catch is coupled to the base.

14. The system of claim 12, wherein the arm includes an arc shaped slot defined at least in part by first and second opposing arc shaped surfaces, the first surface being the catch surface and generally positioned between the second surface and the pivot.

15. The system of claim 14, wherein the second surface is a slip surface configured such that when the support moved to the second position, the second surface contacts the catch allowing the arm to rotate on the pivot.

16. A system for supporting a projector, comprising:
a base;
a support configured to hold the projector;
a pivot on which the support can rotate relative to the base;
a catch surface;
a catch capable of engaging and being separated from the catch surface;
a biasing member providing a biasing force that urges, relative to the base, the support from a second position in which the catch disengages from the catch surface to a first position in which the catch engages the catch surface; and
wherein a sufficient pressure on the support overcomes the biasing force of the biasing member and separates the catch from the catch surface allowing the support to rotate on the pivot, the rotation causing the image cast on the screen by the projector to move.

17. The system of claim 16, wherein the pivot includes a pin and a slot, the pin being inserted through and rotatable within the slot and wherein the slot defines a path of travel for the support, the first and second positions being defined by endpoints of the path of travel.

18. The system of claim 16, wherein:
the rotation causes the image cast on the screen to move from a third position to a fourth position; and
release of the pressure on the support allows the biasing force of the biasing member to cause the catch to engage the catch surface holding the image cast on the screen in the fourth position.

19. A system for supporting a projector, comprising:
a base;
a pivot;
a support coupled to the base at the pivot such that the support can, relative to the base, be rotated on the pivot and shifted between a first position and a second position;
a catch surface;
a catch capable of engaging and being separated from the catch surface;
a means providing a biasing force that urges the support from the second position in which the catch is disengaged from the catch surface to the first position in which the catch engages the catch surface; and
a means for supporting the projector such that an image cast by the projector moves when the support rotates on the pivot.

* * * * *